Nov. 14, 1933.  G. PFROMMER ET AL  1,935,230

DYNAMO ELECTRIC MACHINE

Filed May 7, 1931

Patented Nov. 14, 1933

1,935,230

UNITED STATES PATENT OFFICE 1,935,230

DYNAMO-ELECTRIC MACHINE

Gustav Pfrommer, Oberturkheim, and August Strotbeck, Stuttgart, Germany, assignors to Robert Bosch Aktiengesellschaft, Stuttgart, Germany Application May 7, 1931, Serial No. 535,774, and in Germany January 2, 1931

3 Claims. (Cl. 171—209)

The present invention relates to dynamo-electric machines and more particularly to a fly wheel ignition and generating device having an annular system of magnetic poles which are displaced at equal distances about a circumference and an armature in the form of a polygon, each corner of which is constructed as a pole shoe, an ignition or lighting winding being mounted between each two pole shoes.

In a known construction of this type the number of poles on the armature and on the magnet is the same. At least three windings are necessary for obtaining for example two-spark ignition and lighting current in addition with such an arrangement. As however only one armature winding is located between each two magnet poles in this arrangement four magnet poles are necessary, that is to say if the diameter of the effective magnet cores is the same they must be half as long as the magnet cores in an arrangement for a two-spark ignition alone. The present invention makes it possible to also obtain lighting current for example with two-spark ignition without shortening the length of the magnet cores in that the number of poles on the armature is made a multiple of the number of magnetic poles.

Figure 1:
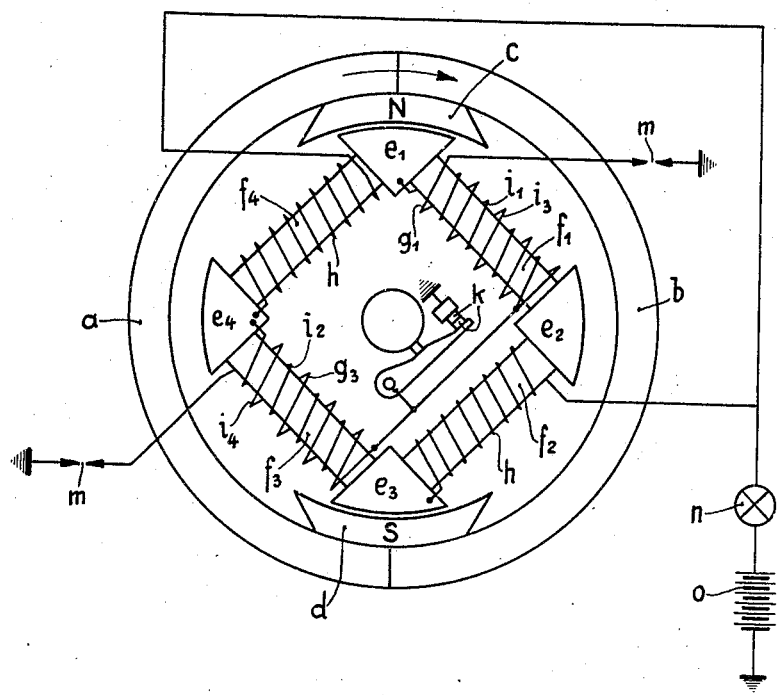

One form of construction of the invention is diagrammatically illustrated by way of example in Figure 1 of the accompanying drawing.

Figure 2:
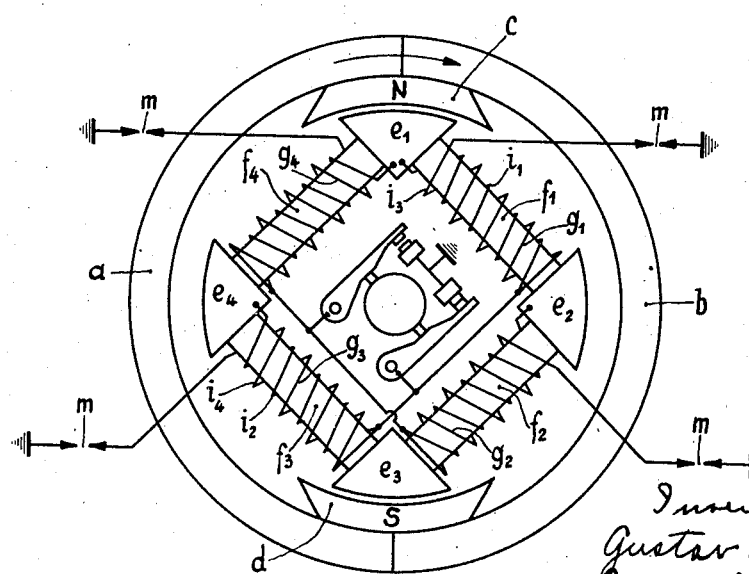

Figure 2 illustrates a form of our invention provided with four ignition windings.

The field magnet system consists of two semi-circular magnets $a$ and $b$ the like poles of which lie adjacent each other. Pole shoes $c$ and $d$ are secured to the magnets at the joints. An armature having a closed magnetic system in the form of a closed polygon is disposed within the ring magnet so formed. This armature consists of four pole shoes $e_1$, $e_2$, $e_3$ and $e_4$ which are connected together by cores $f_1$, $f_2$, $f_3$ and $f_4$. Ignition coils $g_1$, and $g_3$ are mounted on the cores $f_1$ $f_3$ and the lighting coils $h$ are mounted on the cores $f_2$ and $f_4$. One end of the primary coils $i_1$ and $i_2$ is connected to the armature element whilst the other end is connected to a make and break device $k$ which is actuated by the rotor. One end of each of the secondary coils $i_3$ and $i_4$ is connected to the end of the primary winding located on the make and break device whilst the other end is connected to the sparking plugs $m$. With the lighting coils $h$ one end is also connected to the armature body whilst the other is connected through a rectifier to a battery $o$ one pole of which is earthed.

The magneto ignition device operates in the following manner. In the position shown the magnetic flux flows from the pole shoe $c$ as north pole to the same parts over the armature pole shoe $e_1$ through the cores $f_1$ and $f_2$ and to the south pole of the magnet through the cores $f_3$, $f_4$ over the pole shoe $e_3$. After rotating the field magnets through 90° the magnetic flux flows to the same parts through the cores $f_2$, $f_3$ and through the cores $f_1$ and $f_4$. The flux has therefore changed its direction in the cores $f_1$ and $f_3$ but on the other hand has maintained the same direction in the cores $f_2$ and $f_4$. After a further rotation of the field magnets through 90° the flux changes its direction in the cores $f_2$ and $f_4$ but maintains the same direction in the cores $f_1$ and $f_3$. The direction of the flux is therefore changed twice in each core during one complete revolution of the field magnets that is to say two ignition sparks are obtained from each of the two ignition coils during every revolution. The direction of the lighting current of the coils $h$ is changed twice during each revolution.

A further form of the invention illustrated in Figure 2 is made possible in that all the four shanks or arms of the armature may be wound with ignition coils. A four-spark ignition system is thus obtained in which the two coils $g_1$ and $g_3$ on the cores $f_1$ and $f_3$ simultaneously produce sparks twice during each revolution of the magnet and the two coils $g_2$ and $g_4$ on the cores $f_2$ and $f_4$ also produce ignition current simultaneously but in the interval between the ignition from the first pair of coils.

The advantage of the invention lies in the feature that the length of the magnets is not shortened correspondingly to the increase in the number of poles on the armature and the strength of the magnets is not therefore reduced.

What we claim is:

1. A flywheel dynamo-electric machine comprising a plurality of annularly disposed and equally spaced magnetized pole pieces, an armature forming a closed magnetic circuit, a plurality of pole pieces on said armature and windings on said armature for the production of electrical energy, the number of said pole pieces on said armature being a multiple of the number of said magnetized pole pieces.

2. A flywheel dynamo-electric machine comprising a plurality of annularly disposed magnetized pole pieces, an armature forming a closed magnetic circuit, a plurality of pole pieces on said armature and ignition windings on said armature between each of said pole pieces, a make and break device connected to one end of said ignition windings, the number of said pole pieces on the armature being a multiple of the number of said magnetized pole pieces.

3. A flywheel dynamo-electric machine comprising a plurality of annularly disposed magnetized pole pieces, an armature comprising a plurality of magnet cores arranged in the form of a closed polygon and a plurality of pole shoes connecting said magnet cores at the corners of said polygon, and windings on said magnet cores for the production of electrical energy, the number of said pole shoes being a multiple of the number of said magnetized pole pieces.

GUSTAV PFROMMER.
AUGUST STROTBECK.